(12) United States Patent
Akin

(10) Patent No.: US 9,152,971 B2
(45) Date of Patent: Oct. 6, 2015

(54) DYNAMIC MOBILE SELLER ROUTING

(71) Applicant: Jeremiah Joseph Akin, Austin, TX (US)

(72) Inventor: Jeremiah Joseph Akin, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 223 days.

(21) Appl. No.: 13/627,353

(22) Filed: Sep. 26, 2012

(65) Prior Publication Data

US 2014/0089050 A1    Mar. 27, 2014

(51) Int. Cl.
*G06Q 10/00* (2012.01)
*G06Q 30/00* (2012.01)
*G06Q 30/02* (2012.01)

(52) U.S. Cl.
CPC ............ *G06Q 30/02* (2013.01); *G06Q 30/0261* (2013.01)

(58) Field of Classification Search
CPC .................................................. G06Q 30/0261
USPC ................................................ 705/7.11–7.42
See application file for complete search history.

(56) References Cited

U.S. PATENT DOCUMENTS

| | | |
|---|---|---|
| 6,647,269 B2 | 11/2003 | Hendrey et al. |
| 2001/0049636 A1 | 12/2001 | Hudda et al. |
| 2002/0026388 A1 | 2/2002 | Roebuck |
| 2007/0150375 A1* | 6/2007 | Yang ................................ 705/26 |
| 2007/0262860 A1 | 11/2007 | Salinas et al. |
| 2008/0082424 A1* | 4/2008 | Walton ............................ 705/26 |
| 2009/0144624 A1 | 6/2009 | Barnes, Jr. |
| 2010/0127880 A1 | 5/2010 | Schechter et al. |
| 2010/0167646 A1 | 7/2010 | Alameh et al. |
| 2011/0137804 A1 | 6/2011 | Peterson |
| 2011/0143711 A1 | 6/2011 | Hirson et al. |
| 2011/0282700 A1 | 11/2011 | Cockcroft |
| 2012/0059729 A1* | 3/2012 | Roa et al. ...................... 705/26.1 |
| 2012/0290389 A1* | 11/2012 | Greenough et al. ........ 705/14.53 |
| 2012/0330769 A1* | 12/2012 | Arceo ............................. 705/21 |
| 2013/0027227 A1* | 1/2013 | Nordstrom .................... 340/990 |
| 2013/0096966 A1 | 4/2013 | Barnes, Jr. |
| 2013/0132887 A1* | 5/2013 | Amin et al. ................... 715/781 |
| 2013/0197949 A1* | 8/2013 | Dermer et al. .................... 705/5 |
| 2013/0210461 A1* | 8/2013 | Moldvsky et al. .......... 455/456.3 |

* cited by examiner

*Primary Examiner* — Sujay Koneru
(74) *Attorney, Agent, or Firm* — Haynes and Boone, LLP

(57) ABSTRACT

Methods and systems are provided for combining historic data with geospatial data to help mobile sellers enhance their profits. Data can be collected, stored, and analyzed, such as via a server, to help mobile sellers select new locations for selling their products. For example, information regarding the sales of a plurality of other mobile sellers can be collected, stored, and analyzed to help the mobile sellers decide which one of a plurality of different candidate locations should be selected as the next location where the mobile sellers should sell products.

21 Claims, 4 Drawing Sheets

DYNAMIC MOBILE SELLER ROUTING

BACKGROUND

1. Technical Field

The present disclosure generally relates to electronic commerce and, more particularly, relates to the use of analytics by mobile sellers to enhance profits.

2. Related Art

Mobile sellers are common. They sell a wide range of products. For example, mobile sellers sell food, beverages, household items, tools, clothing, and many other things. Mobile sellers can sell from trucks that park along the side of the road, from booths at swap meets and flee markets, from booths at trade shows, as well as from concessions at events such as outdoor concerts, sporting events, festivals, and the like.

Mobile sellers typically move from one location to another location. Of course, the mobile sellers typically attempt to select locations and times for selling in a manner that enhances profits. This is typically done based upon prior experience, common sense, advice from others, and intuition. However, prior experience, common sense, advice from others, and intuition do not necessarily facilitate the selection of those particular locations and times which will actually enhance profits for the mobile seller.

Catering truck operators are examples of such mobile sellers. Catering truck operators typically select the locations and times which they believe will tend to maximize their profits. For example, catering truck operators generally select locations and times for which they believe customers are likely to be present and for which they believe that few, if any, other catering trucks are likely to be present. In this manner, the catering truck operators attempt to maximize the number of potential customers while attempting to minimize unwanted competition.

DETAILED DESCRIPTION

Figure 1:
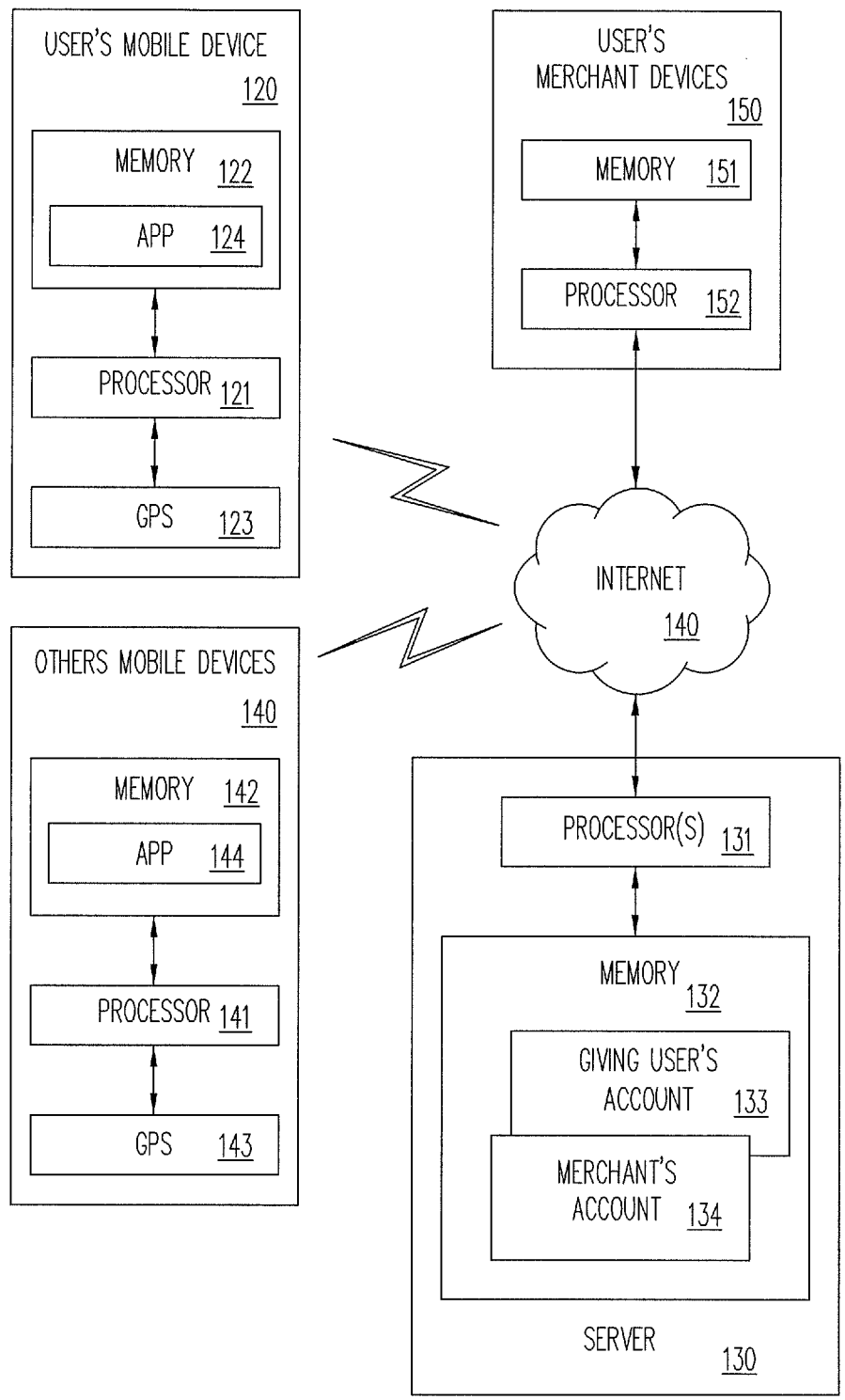
FIG. 1 is a block diagram of a system for providing and using mobile selling analytics, according to an embodiment.

Mobile sellers typically attempt to maximize their profits by selecting selling locations and times based upon such factors as prior experience, common sense, advice from others, and intuition. However, prior experience, common sense, advice from others, and intuition do not necessarily facilitate the selection of those particular locations which will actually maximize profits for the mobile sellers.

According to an embodiment, historic data can be combined with map information, geospacial information, Geographic Information System (GIS) information, and/or other information. The combined information can be analyzed to help the mobile sellers or users substantially enhance their profits. The analysis can determine locations that tend to maximize the number of potential customers for the user while also tending to minimize the amount of competition.

Data can be collected, stored, and analyzed, such as via a server, to help improve the predictive capabilities of the mobile seller analytics system. The server can be a dedicated server, i.e., a server that is used substantially only for providing mobile seller analytics, or can be a shared server, i.e., a server that provides one or more other substantial services.

According to an embodiment, the server can be a payment server or can be associated with one or more payment servers. For example, the server can be a server of a payment provider such as PayPal, Inc. The servers of such payment providers tend to have access to information regarding what products are being purchased, where such purchases are being made, and when such purchases are being made.

According to an embodiment, the server can be an online seller server or can be associated with one or more online seller servers. For example, the server can be a server of an online seller such as eBay, Inc. The servers of such online sellers also tend to have access to information regarding what products are being purchased, where such purchases are being made, and when such purchases are being made.

Information regarding sales of the user can be collected, stored, and analyzed. Information regarding sales of a plurality of other mobile sellers can similarly be collected, stored, and analyzed. Information regarding sales of fixed location vendors, e.g., brick and mortar merchants, can also be collected, stored, and analyzed. Information regarding sales of various such businesses (including the user's business, other mobile seller's businesses, and fixed location vendor's businesses) can be collected, stored, combined, and analyzed to help the user to enhance the user's profits. By using a payment provider server or online seller server or by cooperating with one or more of such servers, the mobile seller analytics system can more readily obtain such information.

The historic sales data can be payment provider data, online sales data, credit data, home ownership data, automobile ownership data, sport/recreational vehicle ownership data, population data, income distribution data, consumer data (such as data regarding what products are purchase at what locations and at what times), demographic data, tax data (such as how much taxes are paid at different locations and such as tax rate boundaries), census data, marketing data, Internet search engine data (such as that compiled by Google regarding Google's account holders), and/or any other available data that can be used, at least in part, to determine when and where mobile sellers should sell products. The data can include any data regarding who purchases what products, where the products are purchased (and/or where the purchasers live, work, or shop) and when the products are purchased. The data can be obtained by any means possible.

Such historic data can be stored in various databases. For example, the data can be stored in payment provider databases, in automobile ownership databases, in sport/recreational vehicle ownership databases, in online sales databases, in credit databases, in home ownership databases, in population databases, in income distribution databases, in consumer databases, in demographic databases, in tax databases, in census databases, in marketing databases, and/or in Internet search engine related databases. The databases can include any databases containing data regarding who purchases what products and when the products are purchased.

Map data, geospatial data, and/or Geographic Information Systems (GIS) data can be used in combination with the historic sales data to determine a new location for a user in an attempt to enhance the profits thereof. The historic sales data can be used to determine what areas have a sufficient demand for products of the user. The map data, geospatial data, and/or GIS data can be used to determine more precisely where, within or near such areas, the user can make mobile sells.

Other data, such as local tax rates, crime rates, purchasing habits, business and school locations, and the like can be used, at least in part, to determine a new location. For example, if all other factors are equal, a location with the lowest local tax rate can be selected.

Map data, geospatial data, and/or Geographic Information Systems (GIS) data can be used in combination with the historic sales data to determine a new location for a user in an attempt to enhance the profits thereof. The historic sales data can be used to determine what areas have a sufficient demand for products of the user. The map data, geospatial data, and/or GIS data can be used to determine more precisely where, within or near such areas, the user can make mobile sales.

The analysis can take into account a present location of the user. Thus, only new locations near the user can be suggested by the mobile seller analytics system. The user can specify that new locations be within a predetermined distance with respect to the present location of the user. The predetermined distance can be specified in terms of a distance metric (such as in miles), in terms of travel time (such as the number of minutes from the user's present location). Travel times can be used in the analysis by assuming traffic conditions and legal speed limits. Alternatively, travel times can be used in the analysis using real time information regarding traffic (such as the actual real time speed of the traffic between the user and the new location) and using actual speed limits. Generally, new locations that tend to minimize drive times can be given higher weight toward selection as compared with new locations that do not tend to minimized drive times.

The analysis can take into account travel costs of the user's mobile vending operation. The analysis can take into account actual, historic costs, such as those based upon historic averages of the user and/or other mobile sellers. For example, if the user has sufficient historic information, an average cost per mile for the user can be used to account for travel costs of the user's mobile vending operation. Otherwise, an average cost per mile for other mobile sellers can be used. The user can enter the average cost per mile or information from which this cost can be determined, such as during a set up process.

The analysis can take into account assumed travel costs base upon rules of thumb, tax laws/regulations, or any other information. For example, the user or anyone else can set up the analysis to assume eighty-five cents per mile as the travel costs.

The analysis can take into account travel costs based upon the user's history and/or any assumptions or other information provided by the user. The travel costs can include time (the money value of the user's time and/or the mobile selling operation's time), opportunity cost (lost sales while traveling), gas, maintenance, insurance, permitting, potential for accidents, and/or any other costs or risks associated with such travel.

Rather than determining a single new location, the mobile seller analytics system can determine either a plurality of alternative new locations and/or can determine one or more routes having a plurality of new locations. One or more alternate locations or one or more alternative routes can be provided for at least one such determined location or route. The number of new locations and alternative new locations can be specified by the user. The starting point and the total time for the route can be specified by the user.

For example, the user can request that a primary route on the east side of town having four new locations, starting at the user's home, and having at total duration of eight hours (including both travel and on-location times) be determined by the server. The user can also request that for each new location, two alternative new locations be provided. The user can also request an alternative or secondary route on the west side of town and another alternative or tertiary route on the north side of town.

Statistics can be provided by the server for primary route, the secondary route, and the tertiary route. For example, the statistics can include total drive times, total on-location times, expected costs, and expected profits. The expected profits can be based, at least in part, on historic sells information for the locations.

Thus, routing can be provided, used and updated in a manner similar to or resulting in a decision tree. As decisions are made regarding which new location to go to next, the route or decision tree can be updated accordingly. The criteria used for each segment of the route (each branch of the decision tree) can be provided to help the user make decisions about which new location to select. Other information regarding each segment of the route can also be provided. For example, information regarding places the user may want to stop (such as the locations of the user's favorite restaurants) along the route can be provided.

The route can be present to the user as a map, text, or any combination thereof. The route can be presented to the user on the screen of the user's mobile device, the user's merchant device, or in any other manner. The route can be presented to the user visually and/or verbally.

In this manner, a dynamic routing plan can be provided that tends to optimize profits while fulfilling other, user defined criteria. The dynamic routing plan can maintain flexibility so that the user can make decisions regarding where to go next. The user can make all of the decisions regarding the route (and thus the decision tree) at one time, such as just prior starting out on the route.

The user can make the decisions one at a time, e.g., in real time, as the user travels over the route. Thus, the user can decide which new location to go to when the user reaches a decision point in the route. A global positioning system (GPS), such as a GPS of the user's mobile device, can update the routing alternatives as the user makes such decisions so that only any remaining alternative routes or alternative locations are shown.

The routing analysis can take into account all of the information discussed herein to determine each new location and the amount of time to be spent at each new location. Each new location and the amount of time spent at each new location can be taken into account to determine each subsequent new location.

The time to be spent at each new location can be determined, at least in part, by what is happening or what is expected to happen at other locations. For example, the time to be spent at an earlier location in the user's route can be shortened when a larger than usual number of customers are expected at a later location in the user's route. Such a larger than usual number of customers can be expected based upon historic sells data. For example, on Mondays and Friday, the number of customers at a particular location can be greater that on other days of the week. Therefore, the user may want to spend more time at this location.

Best routing to each new location can be determined by the server. For example, the shortest route, the safest route, quickest route, and/or the least traffic route can be determined to each new location. The best route can be determined using any desired criteria, such as user defined criteria.

Weighting factors can be used for the criteria, such as the criteria regarding the best route. For example, a combination of the shortest route, the safest route, quickest route, and/or the least traffic route can be determined using different weight factors. The weighting factors can determine how much influence each criteria has on the outcome of best route determination. For example, weighting factors can cause the quickest route to have more influence upon the outcome of the best route determination than does the shortest route. The weighting factors can be provided by the user, for example.

One or more alternative locations can be constrained to be near one another so as to service same customers. Thus, the user can simply park in a different, nearby location and still attract substantially the same customers. An alternative location may be useful when another mobile seller, e.g., a competitor, is at or is expected to be at a particular location.

On the other hand, alternative locations can be at altogether different geographic locations, which can be far from one another and thus service altogether different customers. The user can specify whether alternative locations are to be near one another or far from each other. The user can specify a distance between alternative locations.

User criteria can be used by the processor(s) to determine the new location for the mobile sellers. For example, the user can specify that the new location be within a given distance from the old location, be reachable (at normal or legal driving speeds) by a given time, have a given number of potential customers, be in a neighborhood having a given median income, be likely to meet a given profit goal, etc.

According to an embodiment, the mobile seller analytics system can comprise a memory configured to store analytic data. The mobile seller analytics system can comprise one or more processors that are configured to receive a communication including an indication of a desire of a user to have the mobile seller analytics system select a new location for mobile sales, access the analytic data, and perform analysis using the analytic data to determine the new location for the mobile sales. The processor(s) can send a communication to the user that includes an indication of the new location.

The memory can be associated with at least one of an online seller server and a payment server. The analytic data can include historic sales data and map data that are used in combination to determine the new location for the mobile sales. The analytic data can include historic data regarding past sales of the user, historic data regarding past sales of mobile sellers other than the user, and/or historic data regarding past sales of fixed location vendors.

According to an embodiment, a method can comprise storing, in a memory, analytic data. The method can comprise receiving, electronically via one or more processors, a communication including an indication of a desire of a user to have the mobile seller analytics system select a new location for mobile sales. The method can comprise accessing, via the processor(s), the analytic data. The method can comprise performing, via the processor(s), analysis using the analytic data to determine the new location for the mobile sales. The method can comprise sending, via the processor(s), a communication to the user including an indication of the new location. According to an embodiment, a computer program product can comprise a non-transitory computer readable medium having computer readable and executable code for instructing one or more processors to perform any of the methods discussed herein.

FIG. 1 is a block diagram of the mobile seller analytics system, in accordance with an embodiment. The mobile seller analytics system can include a user's mobile device 120. The user's mobile device 120 can be carried by a mobile seller, e.g., the user. The user's mobile device 120 can be a portable electronic device such as a cellular telephone, a smart phone, a portable computer, laptop computer, a notebook computer, tablet computer, or the like. The user's mobile device 120 can include a processor 121, a memory 122, and a global positioning system (GPS) 123, for example. An app 124 can be stored in the memory 122 and executed by the processor 121 or can be omitted.

The mobile seller analytics system can include a plurality of other mobile devices 140. The other mobile devices 140 can be similar to the mobile device 120 and can be carried by other mobile sellers. The other mobile sellers can be competitors with respect to the user. The mobile seller analytics system can include any number of such mobile seller's devices. The other mobile devices 140 can be portable electronic devices such as cellular telephones, smart phones, portable computers, laptop computers, notebook computers, tablet computers, or the like. Each of other mobile devices 140 can include a processor 141, a memory 142, and a global positioning system (GPS) 143, for example. An app 144 can be stored in the memory 142 and executed by the processor 141 or can be omitted.

The mobile seller analytics system can include a merchant device 150. The merchant device 150 can be a merchant device of the user. The merchant device 150 can be a merchant checkout terminal, cash register, a credit card reader, or the like. The merchant device 150 can include a memory 151 and a processor 152. The merchant device 150 can be a fixture or part of the user's mobile sales equipment, such as a catering truck.

The mobile seller analytics system can include a server 130. The server 130 can be a server of a payment provider, such as Paypal, Inc. The server 130 can be a server of an online seller, such as eBay, Inc. The server 130 can be a single server or can be a plurality of servers. The server 130 can include one or more processors 131 and a memory 132. The memory 132 can be a memory of the server 130 or can be a memory that is associated with the server 130. The memory 132 can be a distributed memory. The memory 132 can store a user account 133 and a merchant account 134.

The merchant device 150, the mobile device 120, the other mobile devices 140, and the server 130 can communicate with one another via a network, such as the Internet 140. The merchant device 110, the mobile device 120, and the server 130 can communicate with one another via one or more networks, such as local area networks (LANs), wide area networks (WANs), cellular telephone networks, and the like.

The analytic data can come from a number of databases, as discussed herein. Examples of such databases can be those databases that are compiled by payment providers and online sellers. Payment providers store information regarding payments made due to sales at various locations. Online sellers store similar information. Such information can be used to facilitate determination of a new location for a mobile seller. For example, if the mobile seller sells sport t-shirts and the analytic data indicates that many sports fans live at a nearby location, then the nearby location would likely be a candidate for the new location of the mobile sellers. The analytic data can indicate that many sports fans live at a nearby location because a high number of sports tickets and sporting goods are sold to people who live in the nearby location. The analytic data can be used by the mobile seller for other purposes, such as deciding what products to sell.

The analytic data can include the present location and/or the expected future location of other mobile sellers. For example, the server 130 can determine the present location and/or the expected future of other mobile sellers from historic sales information, social media networks, such as Facebook® or any other source. This information can be used to in the analysis to determine the new location for the user. In this manner, the user can tend to minimize competition.

Figure 2:
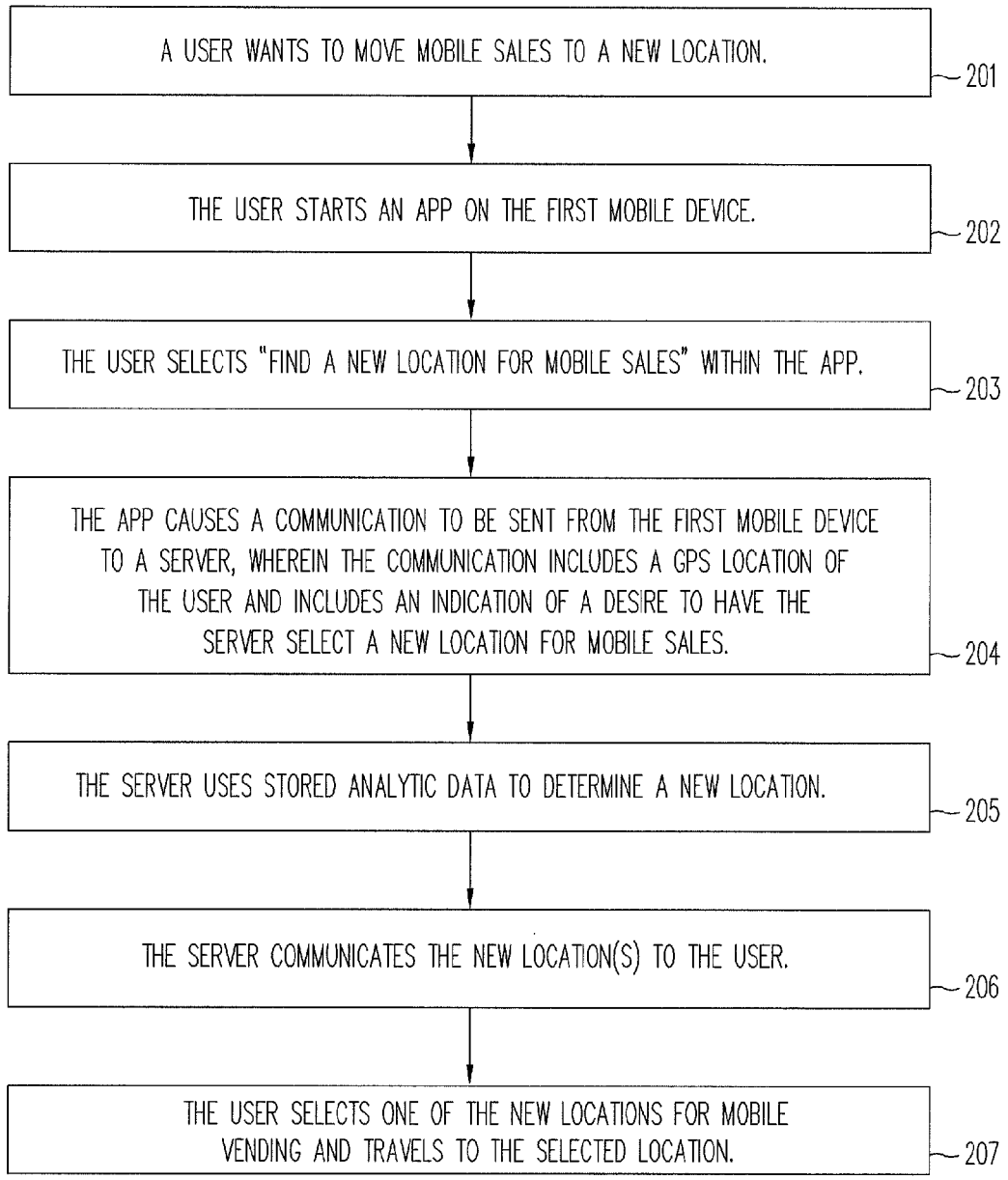
FIG. 2 is a flow chart showing a method for providing and using mobile selling analytics, according to an embodiment.
Figure 3:
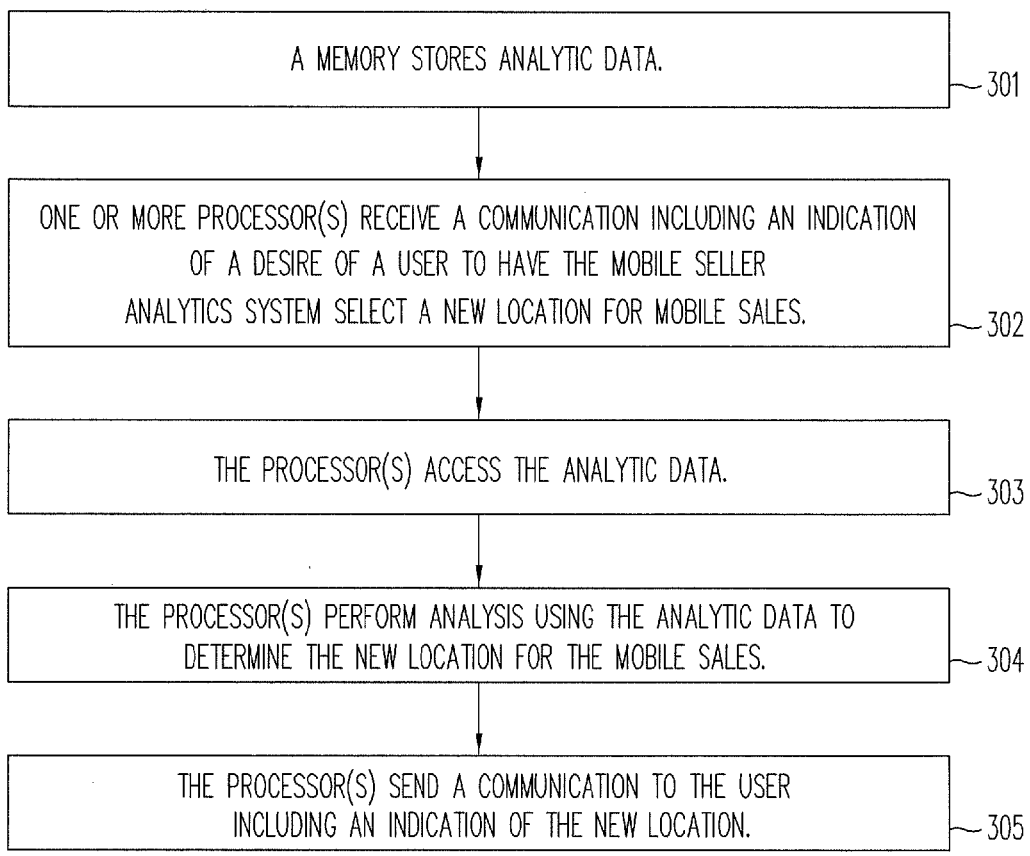
FIG. 3 is a flow chart showing further detail of the method for providing and using mobile selling analytics, according to an embodiment.

FIGS. 2 and 3 are flow charts that describe examples of operation of the method for providing and using mobile selling analytics, according to embodiments thereof. Note that one or more of the steps described herein may be combined, omitted, or performed in a different order, as desired or appropriate.

FIG. 2 is a flow chart showing a method for providing and using mobile selling analytics, according to an embodiment. A user wants to move mobile sales to a new location, as shown in step 201. The user may, for example, have a catering truck that prepares and sells Mexican food such as tacos and burritos. The user can be the owner/operator of the catering truck. The user can have just finished making sales at one location and need to select another location for making sales. The user can suggest potential locations to the mobile seller analytics systems and/or the user can let the mobile seller analytics system suggest new locations.

Typically, the user will want to select a new location that tends to maximize sales, and thus profits as well. Thus, the user generally wants to select a new location having an established market (historically sufficient sales) and ideally lacking any competition (or at least have as little competition as possible). Other criteria can be applicable. For example, the user may want or be constrained (such as by a business license or other permit) to stay within a certain neighborhood or city.

However, at least some of the selection criteria may be at odds with others of the selection criteria. That is, there may be conflicting objectives. For example, the new location with the most prospective customers may also have the most competition. The mobile seller analytics system can analyze data, such as historic data regarding the demand for the user's products and historic data regarding competition at the new location. The mobile seller analytics system can, for example, model the new location to determine the likely profit to be obtained by seller there. The likely profit associated with this location can be compared to the likely profit from other potential new locations. The prospective new location or locations (if alternate location have been requested) with the highest profit potential can then be suggested to the user by the mobile seller analytics system, as long as these location conform to any other criteria.

The user can start an app 124 on the user's first mobile device 120, as shown in step 202. The app 124 can be provided by the seller of the mobile seller analytics system, for example. The seller of the system for providing and using mobile selling analytics can be a payment provider such as PayPal, Inc., an online seller such as eBay, Inc., a market research company, or any other entity.

The user can select "Find A New Location For Mobile Sales" within the app 124, as shown in step 203. The app 124 can provide the user with various different options. For example, the app 124 can provide the user with an option for entering criteria or preference for the new location. Criteria can be firm requirements for the new location which must be met, such as that the new location be within ten miles of the present location. Another example of a criteria would be requiring that the new location be within the city limits of Los Angeles. The app 124 can optionally ask the user for one or more trial locations to consider, either alone or in combination with system selected locations.

The app 124 can provide the user with statistical information. For example, the user can have the app 124 show all areas within a city where the sales of Mexican food by catering trucks is greater than a specified amount during a specified time period. For example, the user can have the app 124 show all areas within the city of Burbank where the sale of Mexican food by catering trucks is greater, on average, than $300 per truck between 12:00 noon and 1:00 PM on a Tuesday.

The app 124 can provide the user with other information. For example, the user can have the app 124 show all of the Chinese restaurants along a route suggested by the mobile seller analytics system or by the user so that the user can have Chinese food for lunch.

Preferences can be flexible requirements which will be met if possible, but which may not be met. For example, a preference may be that no other mobile sellers selling Mexican food be within three miles of the new location. Another example of a preference may be that the new location be within one tenth of a mile of a particular location, such as a specified construction sight.

The app 124 can cause a communication to be sent from the first mobile device 120 to the server 130. The communication can be sent from the first mobile device 120 to the server 130 via one or more networks, such as local area networks (LANs), wide area networks (WANs) such as the Internet 140, cellular telephone networks, and the like. The first communication can include a GPS location of the user and can include an indication of a desire to have the server 130 select a new location for mobile sales, as shown in step 204. Optionally, the user can enter the user's present location.

As a further option, the user can enter a location other than the user's present location. This option can be useful when the user is at a location other than the present location of the user's mobile vending operation when the user is using the app 124 to request the new location. For example, the user may have to be away from the mobile vending operation running errands and may be in the process of returning to move the mobile vending operation to a new location. As a further example, the user can enter present locations for other mobile sellers (such as other catering trucks that are owned by the user) that are not at the present location of the user. In this manner, the user can better manage the routing of a fleet of mobile sellers (such as a fleet of catering trucks). The system can determine new locations and/or routes for a plurality of mobile sellers and can thus mitigate conflicts therebetween while tending to optimization profits for the group.

The server 130 can use stored analytic data to determine a new location, as shown in step 205. For example, server 130 can use analytic data from a payment provider database, an online sales database, a credit database, a home ownership database, a population database, an income distribution database, a consumer database, a demographic database, a tax database, a census database, a marketing database, and/or an Internet search engine database. The server 130 can use any useful information that can be made available to the server 130 to determine the new location. The server 130 can query the Internet, such as via a Google search, in an attempt to find data that may be useful in determining the new location.

The server 130 can use the stored analytic data to determine a plurality of potential new locations. For example, the server 130 can use the stored analytic data to determine a primary new location, at secondary new location, and a tertiary new location.

The server 130 can communicate the new location(s) to the user, as shown in step 206. The server 130 can communicate the new location(s) to the user via one or more networks, such as local area networks (LANs), wide area networks (WANs) such as the Internet 140, cellular telephone networks, and the like.

The user can select one of the new locations for mobile vending and can travel to the selected location, as shown in step 207. Either a new location (with or without one or more alternative new locations) or a new route (with or without one or more alternative new routes) can be requested from the mobile seller analytic system by the user. Thus, the user can receive either a new location (with or without one or more alternative new locations) or a new route (with or without one or more alternative new routes).

Information provided by the mobile seller analytics system can be updated dynamically, e.g., substantially in real time. For example, if a competitor moves to a location near where the user is selling, the user can be notified and the user can be provided with one or more new locations to which the user can move if desired. The new location(s) can be based upon the latest available information, such as substantially real time sales of other vendors in the same area as the user. Such substantially real time sales of other vendors in the same area can be readily available to payment providers, for example.

FIG. 3 is a flow chart showing further detail of the method for providing and using mobile selling analytics, according to an embodiment. The memory 132 can store analytic data, as shown in step 301. The memory 132 can be a plurality of separate memory devices at a plurality of different locations. For example, the memory 132 can comprise a plurality of databases such as payment provider databases, automobile ownership databases, sport/recreational vehicle ownership databases, online sales databases, credit databases, home ownership databases, population databases, income distribution databases, consumer databases, demographic databases, tax databases, census databases, marketing databases, and Internet search engine related databases.

The processor(s) 131 receive a communication including an indication of a desire of the user to have the mobile seller analytics system select a new location or a new route for mobile sales, as shown in step 302. The communication can contain options regarding the request. For example, the user can ask for one alternate new location although the user had previously set up the mobile seller analytics system to provide only a single new location during an earlier set up procedure.

The processor(s) 131 can access the analytic data, as shown in step 303. Accessing the analytic data can include accessing the plurality of different databases, such as payment provider databases, automobile ownership databases, sport/recreational vehicle ownership databases, online sales databases, credit databases, home ownership databases, population databases, income distribution databases, consumer databases, demographic databases, tax databases, census databases, marketing databases, and Internet search engine related databases.

The processor(s) 131 perform analysis using the analytic data to determine the new location for the mobile sales, as shown in step 304. The analysis can include various analytic tools or methodologies, such as the simplex algorithm, Monte Carlo simulation, decision tree algorithms, game theory algorithms, queuing theory algorithms, Markov decision making processes (POMDPs), shortest route algorithms, expected value calculations, Bayesian statistical analysis and the like.

Standard or pre-defined assumptions can be used to perform the analysis. For example, the user's profit can be assumed to be ten percent of sales and the user's travel cost can be assumed to be 75 cents per mile. The user can modify any such pre-defined assumptions, such as during a set up process or on a case-by-case basis. User provided assumptions can be used to perform the analysis and the user provided assumption can be provided during the set up process.

The processor(s) 131 send a communication to the user including an indication of the new location, as shown in step 305. The user can then choose to go to the suggested new location, request a different location, and/or modify the criteria regarding the selection process.

As an example, consider a person who uses a service like PayPal Here® wants to sell water at a Fourth of July event. The person can look up, using the app 124, where the best place to sell water in a given city is likely to be. Data like historical sales, tax rates (one city may have a better tax rate than another), population, etc. can be used by the server 130 to predict where the best place to sell water would be.

As a further example, a person who uses a service like PayPal Here® is selling kettle corn from a mobile food trailer. PayPal Here® or the app 124 displays a notification that if the user moves two blocks down, then the user will be in a location that has a lower tax rate. The app 124 can be a module or portion of another app, like a PayPal Here® app.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, micro-controller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and execute one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Payment processing can be through known methods, such as transaction details being communicated to the payment provider through the app, the payment provider processing the details, which may include user account identifier information and authentication, merchant information, and transaction details. The user account may be accessed to determine if any restrictions or limitations may prevent the transaction from being approved. If approved, the payment provider may send a notification to the merchant and/or the user.

Payment processing can be through known methods, such as transaction details being communicated to the payment provider through the app, the payment provider processing the details, which may include user account and identifier information and authentication, merchant information, and transaction details. The user account may be accessed to determine if any restrictions or limitations may prevent the transaction from being approved. If approved, the payment provider may send a notification to the merchant and/or the user.

Figure 4:
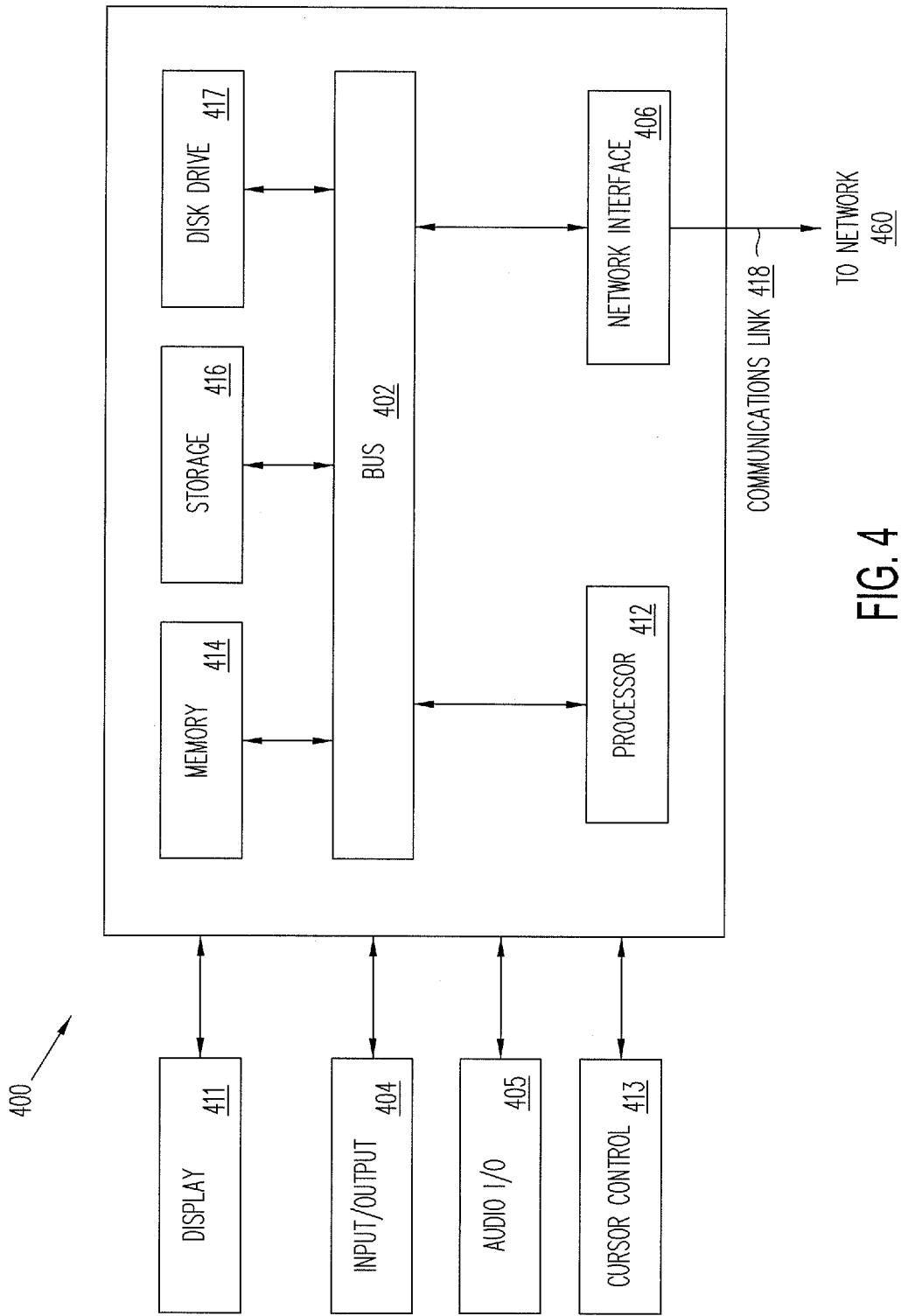
FIG. 4 is a block diagram of an example of a computer that is suitable for use in the system for providing and using mobile selling analytics, according to an embodiment.

FIG. 4 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used herein, the term "map data" can include any map, geospatial, GIS, or other location data.

As used herein, the term "store" can include any business or place of business. The store can be a mobile store or a brick and mortar store or an online store. The store can be any person or entity that sells a product.

As used herein, the term "product" can include any item or service. Thus, the term "product" can refer to physical products, digital goods, services, or anything for which a user can make a payment, including charitable donations. A product can be anything that can be sold.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

As used herein, the term "time" can include time of day, day of the week, day of the month, day of the year, week of the year, and/or month of the year. The term "time" can include any relevant time frame.

Information regarding the sales of a plurality of other merchants, such as mobile sellers and fixed location vendors, as well as demographic, map and other information, can be collected, stored, and analyzed together with information regarding the user to help the user decide which one of a plurality of different candidate locations should be selected as the next or new location where the user should sell products. In this manner, the mobile sellers can tend to enhance or optimize profits.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A computer system for dynamically routing a mobile sales operation, comprising:
    a computing device associated with the mobile sales operation;
    a global positioning system (GPS) device to navigate the mobile sales operation;
    a memory; and
    one or more processors in communication with the memory to:
        receive, from the computing device associated with the mobile sales operation, a request to provide location recommendations for each of a plurality of available routes to the mobile sales operation, the request comprising GPS coordinates of the mobile sales operation provided by the GPS device;
        analyze analytic data comprising sales of one or more mobile competitors of the mobile sales operation in view of a location based on the GPS coordinates of the mobile sales operation to determine the location recommendations for the available routes;
        determine the location recommendations for the available routes, at least in part, based on the sales of the one or more mobile competitors in view of the location based on the GPS coordinates of the mobile sales operation;
        send a first communication comprising the location recommendations for the available routes to the computing device of the mobile sales operation; and
        send, by the one or more processors, a second communication comprising GPS coordinates of at least one updated location recommendation for one of the available routes to the computing device of the mobile sales operation in response to detecting movement of at least one of the mobile competitors.

2. The system of claim 1, wherein the analytic data further comprises historic sales data and map data that are used in combination to determine the new location recommendations for the available routes.

3. The system of claim 1, wherein first communication further comprises total travel time and total on-location time for each of the available routes.

4. The system of claim 1, wherein the determining of the location recommendations for the available routes is further based on a predefined assumption of profit.

5. The system of claim 1, wherein at least one of the available routes is determined, at least in part, based on respective driving conditions on the route.

6. The system of claim 1, wherein the available routes comprise a primary route and at least one alternative route.

7. The system of claim 1, wherein the analytic data further comprises data from at least one data source selected from the group consisting of:
    a payment provider database;
    an online sales database;
    a credit database;
    a home ownership database;
    a population database;
    an income distribution database;
    a consumer database;
    a demographic database;
    a tax database;
    a census database;
    a marketing database; and
    an interne search engine.

8. A computer-implemented method for dynamically routing a mobile sales operation, comprising:
    receiving, from a computing device associated with the mobile sales operation, a request to provide location recommendations for each of a plurality of available routes to the mobile sales operation, the request comprising global positioning system (GPS) coordinates from a GPS device associated with the mobile sales operation;
    analyzing, by a computer system, analytic data comprising sales of one or more mobile competitors of the mobile sales operation in view of a location based on the GPS coordinates of the mobile sales operation to determine the location recommendations for the available routes;
    determining, by the computer system, the location recommendations for the available routes, at least in part, based on the sales of the one or more mobile competitors in view of the location based on the GPS coordinates of the mobile sales operation;
    sending, by the computer system, a first communication comprising the location recommendations for the available routes to the computing device associated with the mobile sales operation; and
    sending, by the computer system, a second communication comprising GPS coordinates of at least one updated location recommendation for one of the available routes to the computing device of the mobile sales operation in response to detecting movement of at least one of the mobile competitors.

9. The computer-implemented method of claim 8, wherein determining the location recommendations for the available routes is also at least in part based on a cost to relocate the mobile sales operation between the locations along each respective available route.

10. The computer-implemented method of claim 8, wherein the sales of the one or more mobile competitors is provided by a payment processing server.

11. The computer-implemented method of claim 8, wherein the analytic data further comprises historic sales data of the mobile sales operation.

12. The computer-implemented method of claim 8, wherein the second communication further comprises an updated total travel time and an updated total on-location time for each updated available route having at least one updated location recommendation.

13. The method of claim 8, wherein the analytic data comprises sales of a combination of at least one mobile seller other than the mobile sales operation and at least one other fixed location vendor.

14. The method of claim 8, wherein the analytic data includes data from at least one data source selected from the group consisting of:

a payment provider database;
an online sales database;
a credit database;
a home ownership database;
a population database;
an income distribution database;
a consumer database;
a demographic database;
a tax database;
a census database;
a marketing database; and
an internet search engine.

15. A non-transitory computer readable medium comprising instructions, that when executed by one or more processors of a computing device, cause the one or more processors to:
- receive, from a computer system associated with a mobile sales operation, a request to provide location recommendations for each of a plurality of available routes to the mobile sales operation, the request comprising global positioning system (GPS) coordinates of the mobile sales operation from a GPS device associated with the mobile sales operation;
- analyze, by the computing device, analytic data comprising sales of one or more mobile competitors of the mobile sales operation in view of a location based on the GPS coordinates of the mobile sales operation to determine the location recommendations for the available routes;
- determine, by the computing device, the location recommendations for the available routes, at least in part, based on the sales of the one or more mobile competitors in view of the location based on the GPS coordinates of the mobile sales operation;
- send, by the computing device, a first communication comprising the location recommendations for the available routes to the computer system associated with the mobile sales operation; and
- send, by the computing device, a second communication comprising GPS coordinates of at least one updated location recommendation for one of the available routes to the computing device associated with the mobile sales operation in response to detecting movement of at least one of the mobile competitors.

16. The non-transitory computer readable medium of claim 15, wherein the available routes comprise a primary route and at least one alternative route.

17. The non-transitory computer readable medium of claim 15, wherein the sales of the one or more competitors is provided by an online marketplace server.

18. The non-transitory computer readable medium of claim 15, wherein the analytic data further comprises historic sales data of the mobile sales operation.

19. The non-transitory computer readable medium of claim 15, wherein the second communication further comprises an updated total travel time and an updated total on-location time for each updated available route having at least one updated location recommendation.

20. The non-transitory computer readable medium of claim 15, wherein the analytic data further comprises historic sales data of at least one other vendor having both a fixed location and a mobile sales presence.

21. The non-transitory computer readable medium of claim 15, wherein the analytic data includes data from at least one data source selected from the group consisting of:
a payment provider database;
an online sales database;
a credit database;
a home ownership database;
a population database;
an income distribution database;
a consumer database;
a demographic database;
a tax database;
a census database;
a marketing database; and
an internet search engine.

* * * * *